(12) United States Patent
Shaffer et al.

(10) Patent No.: US 9,027,361 B2
(45) Date of Patent: May 12, 2015

(54) WATER FILTER

(71) Applicant: General Electric Company, Schenectady, NY (US)

(72) Inventors: Timothy Scott Shaffer, LaGrange, KY (US); William A. Baker, Louisville, KY (US)

(73) Assignee: General Electric Company, Schenectady, NY (US)

(*) Notice: Subject to any disclaimer, the term of this patent is extended or adjusted under 35 U.S.C. 154(b) by 206 days.

(21) Appl. No.: 13/688,701

(22) Filed: Nov. 29, 2012

(65) Prior Publication Data
US 2014/0144173 A1 May 29, 2014

(51) Int. Cl.
*B01D 35/157* (2006.01)
*F25D 23/12* (2006.01)

(52) U.S. Cl.
CPC ...... *B01D 35/1573* (2013.01); *B01D 2201/302* (2013.01); *F25D 23/126* (2013.01); *F25D 2323/121* (2013.01)

(58) Field of Classification Search
CPC ............ B01D 35/1573; B01D 2201/302; B01D 29/603; B01D 35/143; F25B 43/003; F25D 23/126; F25D 2400/361; F25D 2323/121; C02F 1/001; C02F 2209/40
USPC .......... 62/317, 318, 190, 389, 448, 347; 210/435, 232
See application file for complete search history.

(56) References Cited

U.S. PATENT DOCUMENTS

| 5,551,909 | A  | * | 9/1996  | Bailey ............................ 451/75 |
| 7,067,054 | B2 |   | 6/2006  | Fritze |
| 7,357,867 | B2 | * | 4/2008  | Knight et al. ............ 210/497.01 |
| 7,704,397 | B2 | * | 4/2010  | Meddock et al. ............. 210/338 |
| 8,354,024 | B2 | * | 1/2013  | Ihle et al. ...................... 210/238 |
| 8,580,109 | B2 | * | 11/2013 | Kruckenberg et al. ......... 210/85 |
| 8,746,003 | B2 | * | 6/2014  | Yoon .............................. 62/331 |
| 2004/0069719 | A1 | * | 4/2004 | Wang ............................ 210/749 |
| 2005/0092665 | A1 | * | 5/2005 | Kirchner ...................... 210/134 |
| 2005/0199283 | A1 | * | 9/2005 | Mouhebaty et al. ..... 137/115.08 |
| 2008/0141697 | A1 | * | 6/2008 | Coleman ........................ 62/318 |
| 2009/0293528 | A1 | * | 12/2009 | Buchstab et al. ............... 62/318 |
| 2010/0275633 | A1 | * | 11/2010 | An et al. ........................ 62/318 |

FOREIGN PATENT DOCUMENTS

WO   WO 2011/030340 A2   3/2011

* cited by examiner

*Primary Examiner* — Mohammad M Ali
(74) *Attorney, Agent, or Firm* — Dority & Manning, P.A.

(57) ABSTRACT

A water filter is provided. The water filter includes a casing with a filtering media disposed within the casing. The water filter also includes a plug and a water soluble support. The plug can impede a flow of water through the chamber in order to encourage replacement of the water filter.

17 Claims, 8 Drawing Sheets

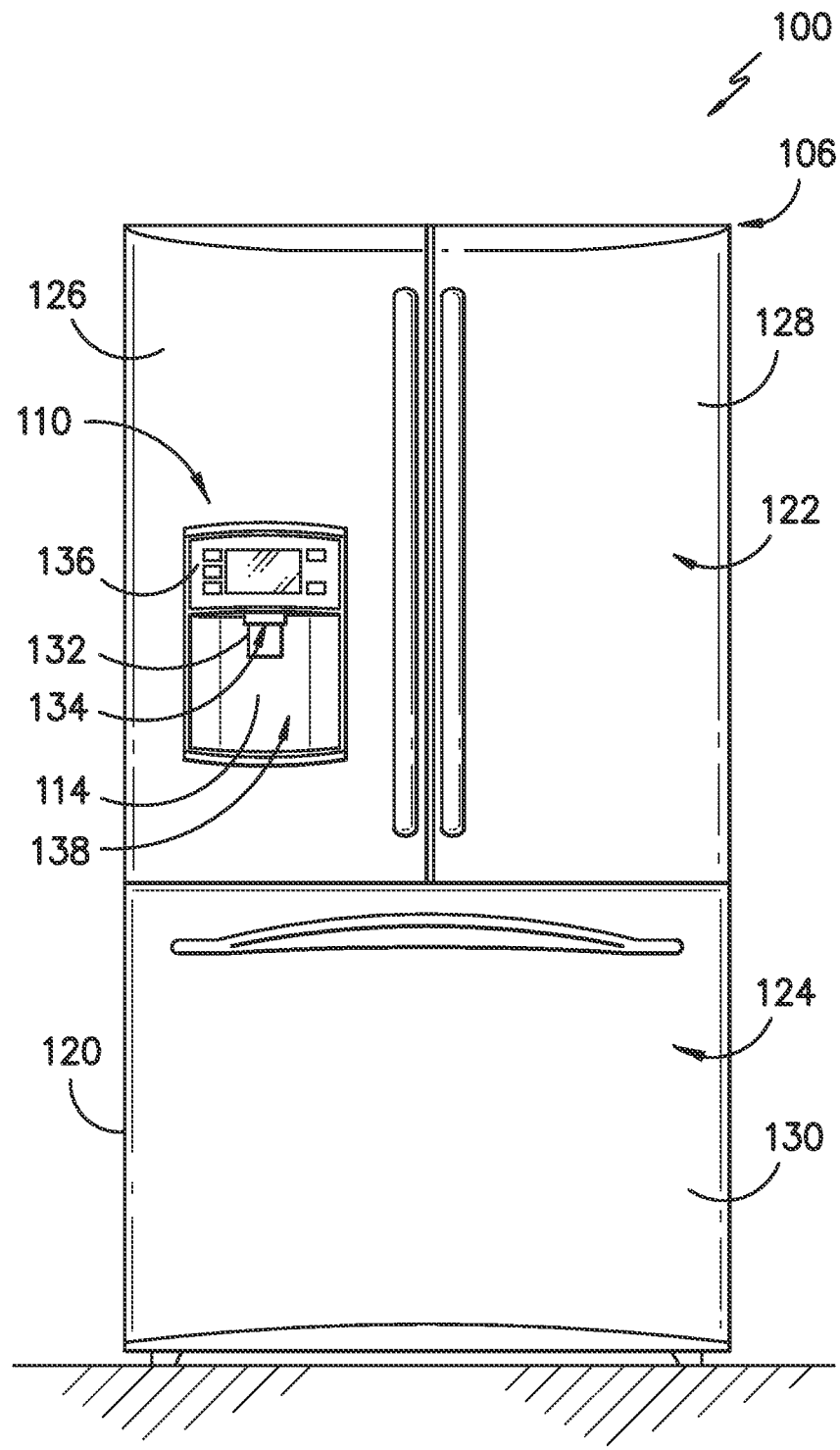
FIG. -1-

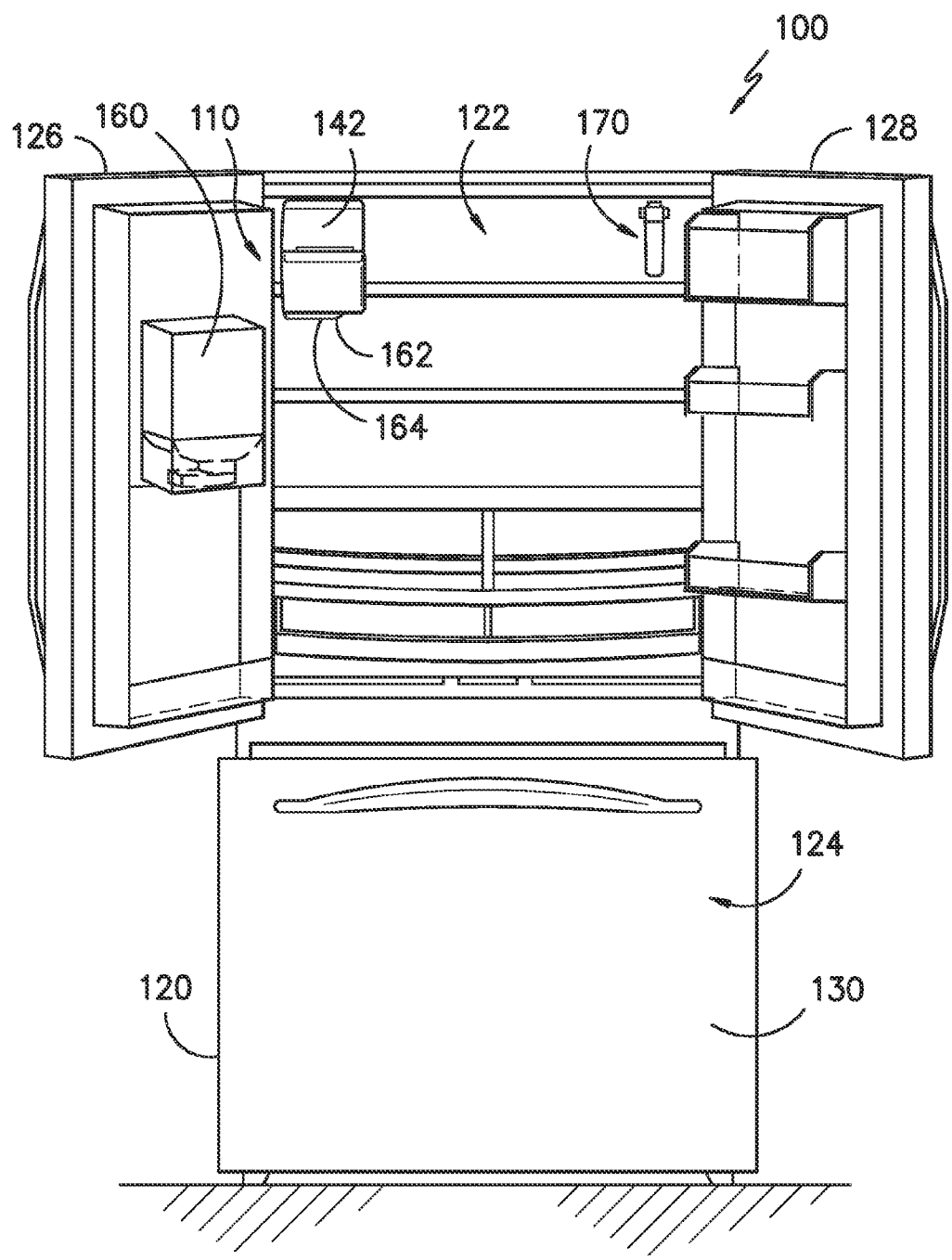
FIG. -2-

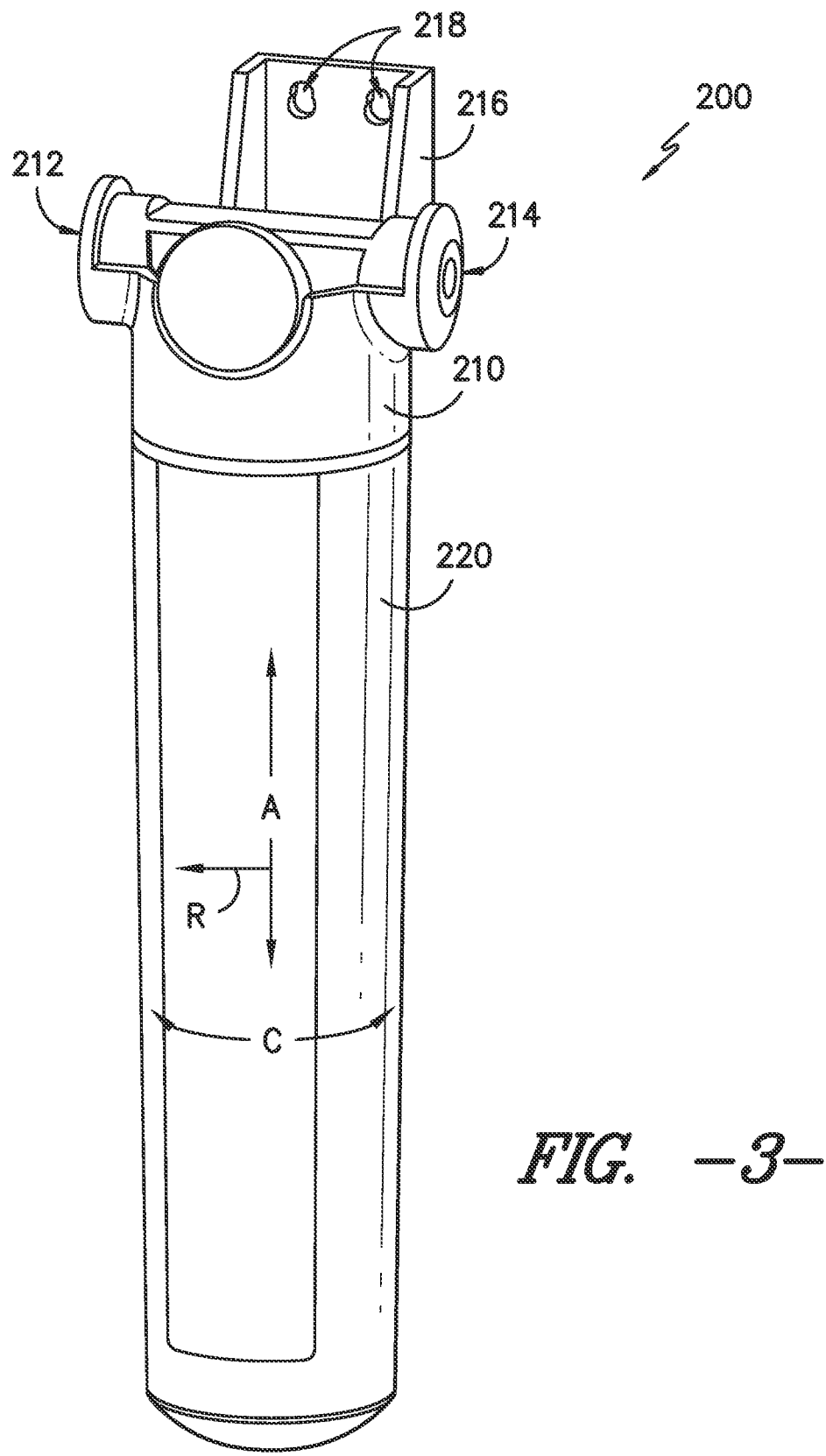
FIG. -3-

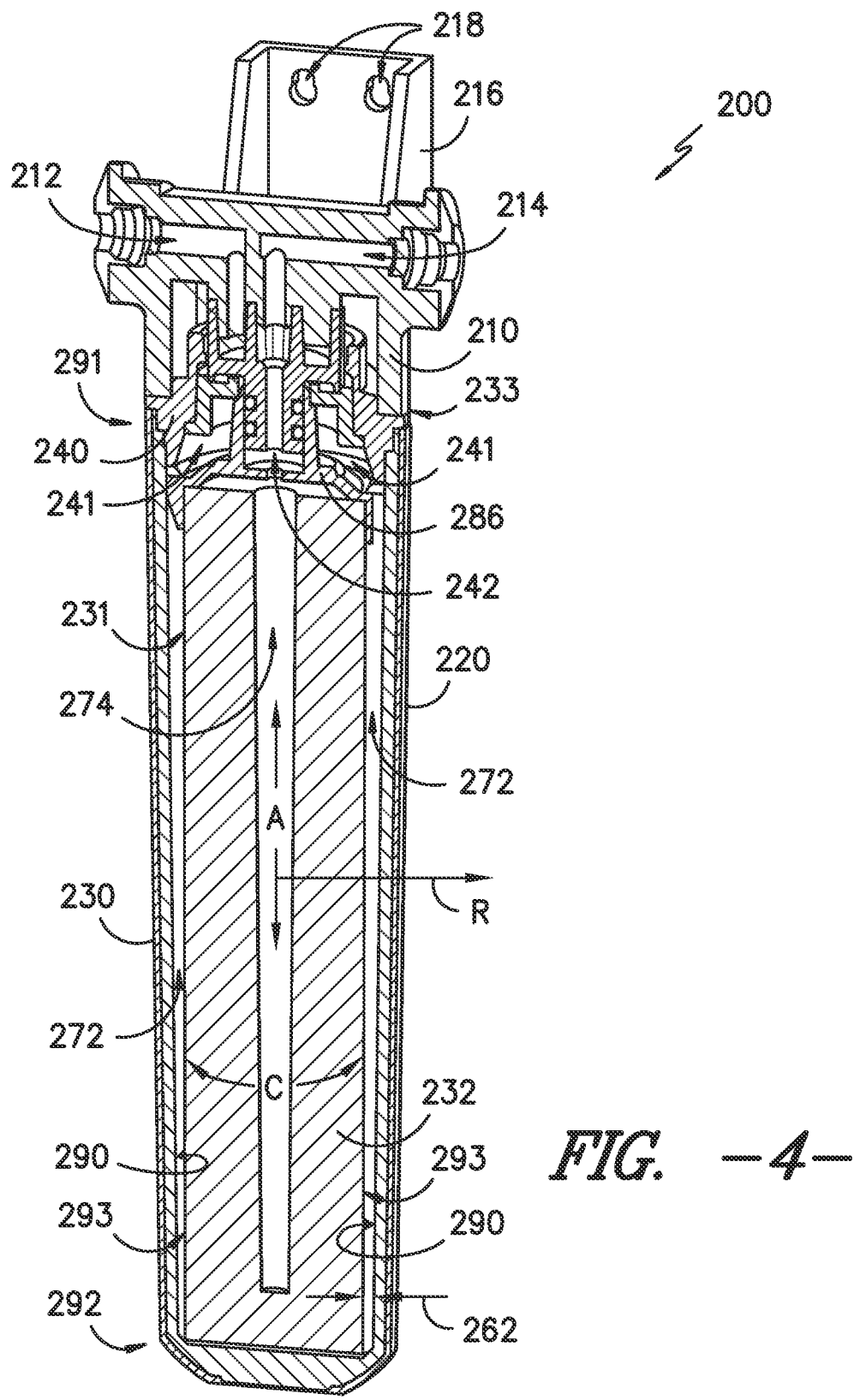
FIG. -4-

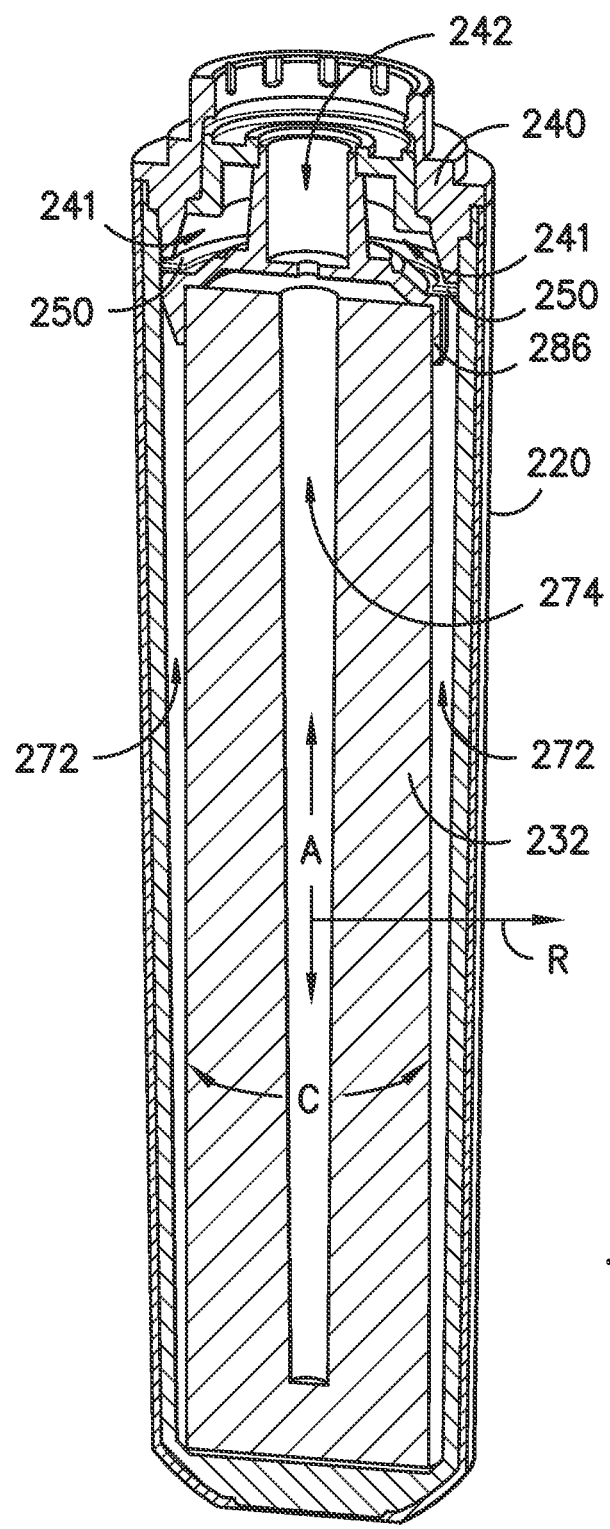
FIG. -5-

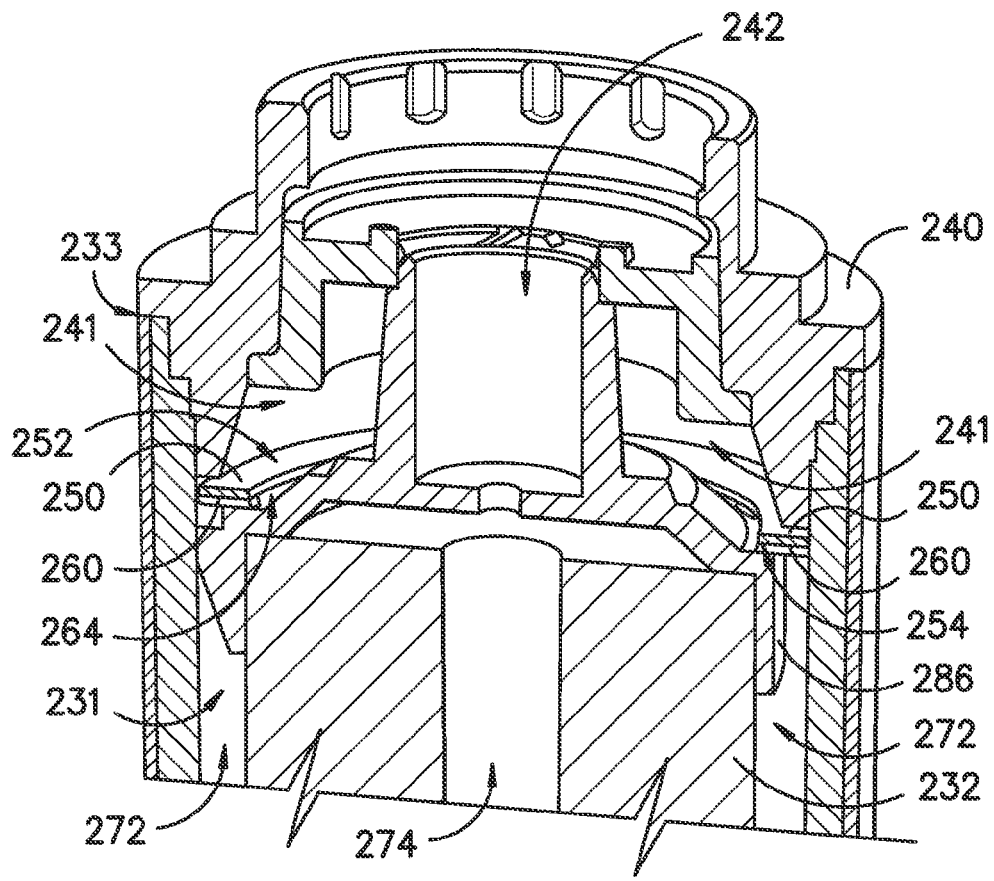
FIG. -6-
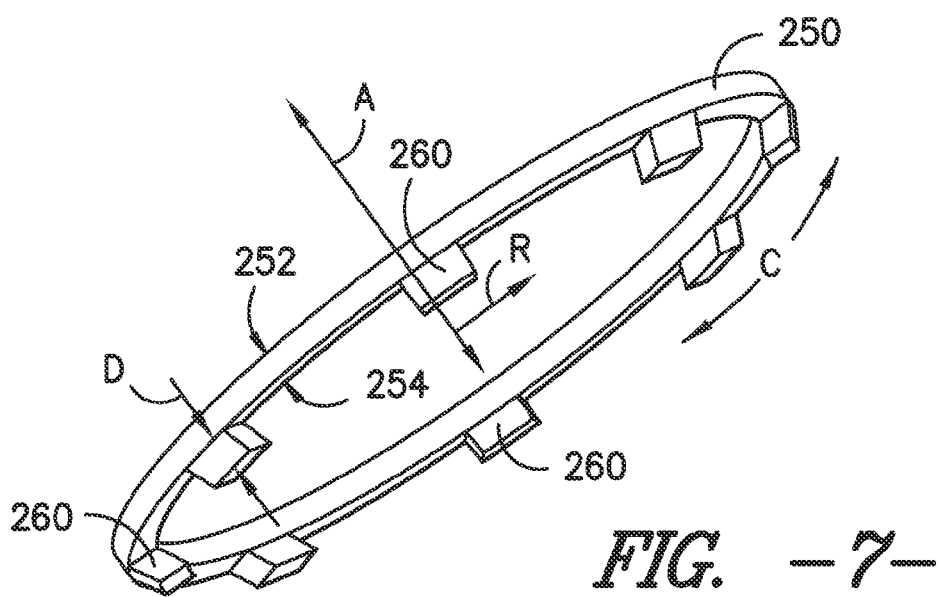
FIG. -7-

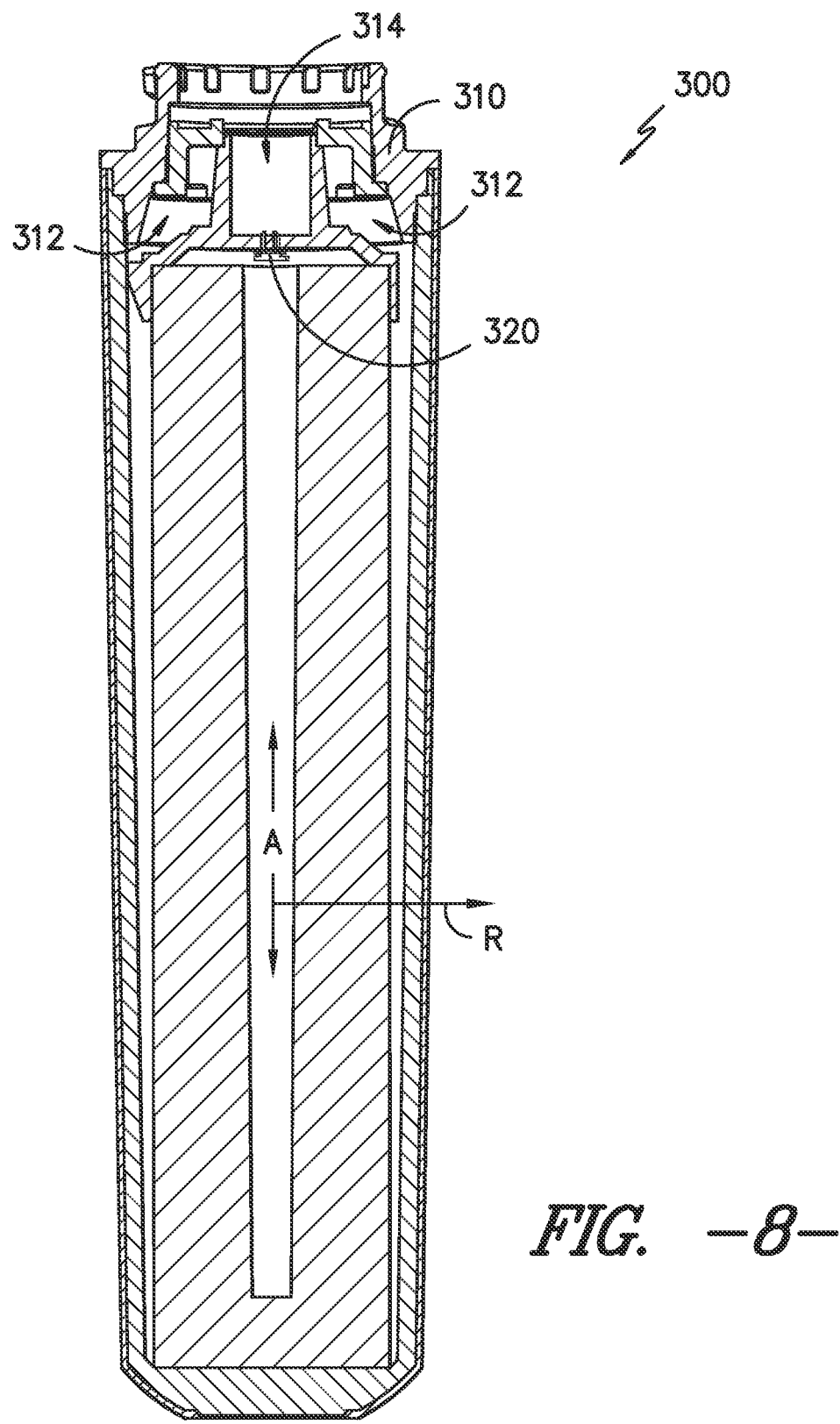
FIG. -8-

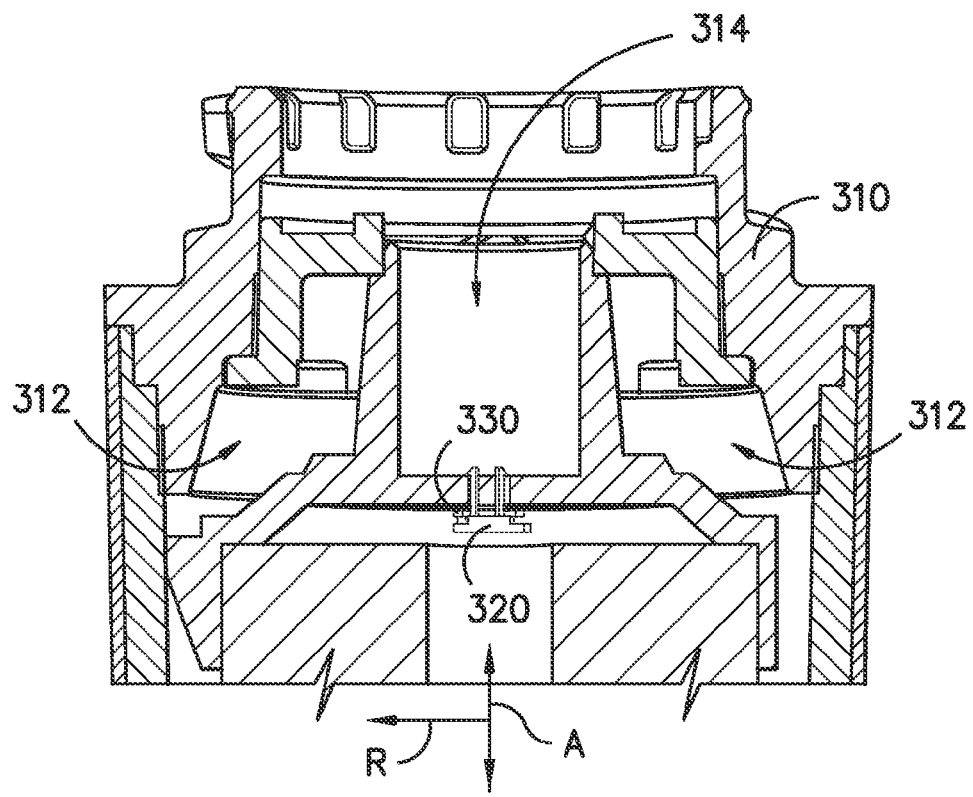
FIG. -9-
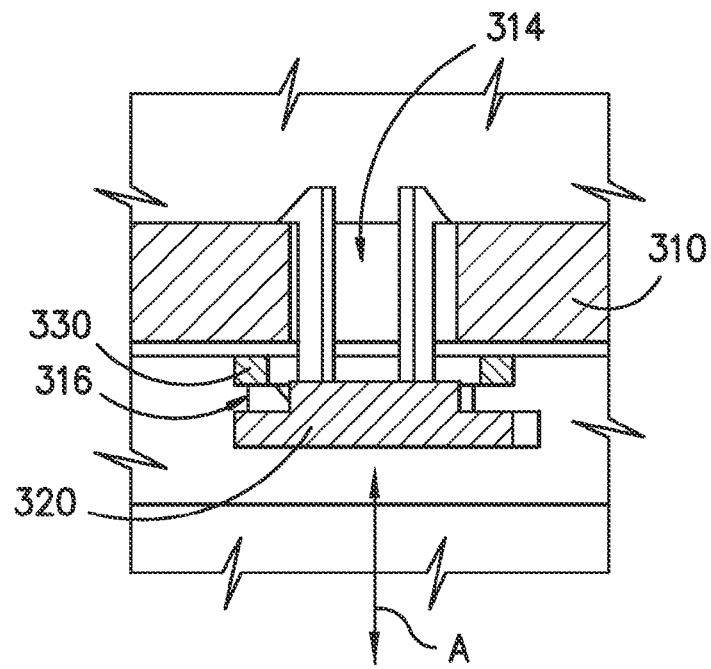
FIG. -10-

WATER FILTER

FIELD OF THE INVENTION

The present subject matter relates generally to water filters.

BACKGROUND OF THE INVENTION

Water filters are generally divided into two classes: point of entry water filters and point of use water filters. Point of use water filters can be installed at a kitchen sink or within a refrigerator appliance in order to filter water entering such devices. In particular, water filters are generally provided with a filtering media such as a block of activated carbon. The water filter's filtering media can adsorb or remove contaminants such as chlorine and lead from water prior to delivering such water to a user. For example, the water filter can filter water prior to such water entering the refrigerator's ice maker or water dispenser.

The block of activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block. However, at some point, the pore surfaces become saturated with contaminates and can no longer adsorb the incoming contaminates in the water stream. In contrast to mechanically filtered contaminants that clog the pores over time, the adsorbed contaminants generally do not impede flow through the filter and therefore there is no consumer queue alerting them that the filter is no longer properly functioning.

In addition, the pores are generally too large to prevent microbial contaminants such as bacteria from passing through the block. Similarly, the adsorption characteristics of activated carbon are inconsistent with removing bacteria from the flow of water. Conditions within the filtering media can also provide for large scale bacteria growth, particularly over time. For example, bacteria can start to grow within the carbon block given the right water conditions and sufficient time.

To hinder such bacteria growth, the water filter is preferably replaced or serviced about every six months regardless of its current performance. However, many consumers forget to replace the water filter or choose to simply ignore the recommendation. In particular, certain consumers only replace the water filter after it has become blocked, e.g., by sediment accumulation around and within the carbon block.

Accordingly, a water filter with features for blocking or impeding a flow of water through the water filter in order to encourage replacement of the water filter would be useful. In particular, a water filter with features for blocking or impeding a flow of water through the water filter after about six months in order to encourage replacement of the water filter would be useful.

BRIEF DESCRIPTION OF THE INVENTION

The present subject matter provides a water filter. The water filter includes a casing with a filtering media disposed within the casing. The water filter also includes a plug and a water soluble support. The plug can impede a flow of water through the chamber in order to encourage replacement of the water filter. Additional aspects and advantages of the invention will be set forth in part in the following description, or may be apparent from the description, or may be learned through practice of the invention.

In a first exemplary embodiment, a water filter is provided. The water filter includes a casing that defines a chamber for receipt of water to be filtered. A filtering media is disposed within the chamber of the casing. The casing and the filtering media define a path for a flow of water through the chamber of the casing. A plug is also positioned within the chamber of the casing and in the path for the flow of water through the chamber of the casing. A water soluble support is mounted to the plug. The at least one water soluble support is configured to position the plug in order to permit the flow of water through the chamber of the casing. The plug hinders the flow of water through chamber of the casing when the at least one water soluble support has dissolved.

In a second exemplary embodiment, a refrigerator appliance is provided. The refrigerator appliance includes a cabinet that defines a chilled compartment for receipt of food items for storage. A water filter is mounted to the cabinet. The water filter includes a casing that defines a chamber. The water filter includes a casing that defines a chamber for receipt of water to be filtered. A filtering media is disposed within the chamber of the casing. The casing and the filtering media define a path for a flow of water through the chamber of the casing. A plug is also positioned within the chamber of the casing and in the path for the flow of water through the chamber of the casing. A water soluble support is mounted to the plug. The at least one water soluble support is configured to position the plug in order to permit the flow of water through the chamber of the casing. The plug hinders the flow of water through chamber of the casing when the at least one water soluble support has dissolved.

In a third exemplary embodiment, a water filter is provided. The water filter includes a casing that defines a chamber for receipt of water to be filtered. A filtering media is disposed within the chamber of the casing. A plug is movable between a first position in which the plug permits a flow of water through the filtering media and a second position in which the plug blocks a flow of water through the filtering media. At least one water soluble support is connected to the plug and is configured for supporting the plug in the first position until the at least one water soluble support dissolves and the plug shifts to the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front view of a refrigerator appliance according to an exemplary embodiment of the present subject matter.

FIG. 2 provides a front view of the refrigerator appliance of FIG. 1 with refrigerator doors of the refrigerator appliance shown in an open configuration to reveal a fresh food chamber of the refrigerator appliance.

FIG. 3 provides a perspective view of a water filtering assembly according to an exemplary embodiment of the present subject matter. The water filtering assembly includes a water filter and a manifold.

FIG. 4 provides a section view of the water filtering assembly of FIG. 3.

FIG. 5 illustrates a section view of the water filter of FIG. 3.

FIG. 6 is a partial, section view of the water filter of FIG. 3. The water filter includes a cap, a plug, and water soluble supports.

FIG. 7 is a perspective view of the plug and water soluble supports removed from the water filter of FIG. 6.

FIG. 8 provides a section view of a water filter according to an additional exemplary embodiment of the present subject matter.

FIG. 9 is a partial, section view of the water filter of FIG. 8. The water filter includes a cap, a plug, and a water soluble support.

FIG. 10 provides a partial, section view of the plug and water soluble support of the water filter of FIG. 9.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front view of an exemplary embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In the exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides). Consequently, the description set forth herein is for illustrative purposes only and is not intended to limit the invention in any aspect.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access freezer chamber 124. In the exemplary embodiment, recessed portion 138 is positioned at a level that approximates the chest level of a user.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within refrigerator chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. More particularly, insulated housing 142 contains an ice maker for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As door 126 is closed or opened, receptacle 160 is moved in and out of position under insulated housing 142.

In an alternative exemplary embodiment, insulated housing 142 and its ice maker can be positioned directly on door 126. In still another exemplary embodiment, the ice maker could be located on the door for the freezer compartment and directly over receptacle 160, e.g., in a configuration where the fresh food compartment and the freezer compartment are located side by side (as opposed to over and under as shown in FIGS. 1 and 2). As such, the use of an insulated housing would be unnecessary. Other configurations for the location of receptacle 160, an ice maker, and/or insulated housing 142 may be used as well.

Operation of the refrigerator appliance 100 is regulated by a controller (not shown) that is operatively coupled to user interface panel 136 and/or activation member 132 (shown in FIG. 1). Panel 136 provides selections for user manipulation of the operation of refrigerator appliance 100 such as e.g., selections between whole or crushed ice, chilled water, and/or other options as well. In response to user manipulation of the user interface panel 136, the controller operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout refrigerator appliance 100. For example, the controller may be located within beneath the user interface panel 136 on door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface 136 may be in communication with the controller via one or more signal lines or shared communication busses.

Refrigerator appliance 100 also includes a water filtering assembly 170 that filters water coming into refrigerator appliance 100 from a water supply (not shown) such as a municipal water source or a well. Water filtering assembly 170 can remove contaminants such as chlorine, chloroform, lead, arsenic, pharmaceuticals, microbes, and/or other undesirable substances from water supplied to refrigerator appliance 100. In particular, water filtering assembly 170 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

FIG. 3 provides a perspective view of a water filtering assembly 200 according to an exemplary embodiment of the present subject matter. Water filtering assembly 200 may be used in the refrigerator appliance 100, e.g., as water filtering assembly 170 (FIG. 2). In alternative exemplary embodiments, water filtering assembly 200 may be used in any other suitable appliance such as an ice maker, as a point of use water filtration system, e.g., installed beneath a sink, or as a point of entry water filtration system for an entire household.

Water filtering assembly 200 defines an axial direction A, a radial direction R, and a circumferential direction C. Water filtering assembly 200 also includes a manifold 210 and a water filter 220 removably mounted to manifold 210. Manifold 210 includes a mounting bracket 216 that defines holes 218. Fasteners (not shown) such as nails, pegs, tabs, screws, or bolts may be inserted through holes 218 to mount water filtering system 200, e.g., to housing 120 of refrigerator appliance 100 (FIG. 2), to a kitchen cabinet beneath a kitchen sink, or to a wall within a house. Manifold 210 also defines an entrance 212 and an exit 214. Entrance 212 may be in fluid communication with a water supply and receive unfiltered water from the water supply. From entrance 212, such unfiltered water is directed into water filter 220. Such unfiltered water passes through water filter 220 and exits manifold 210 at exit 214 as filtered water. Such filtered water may, e.g., be directed to the ice maker within insulated housing 142 (FIG. 2), discharging outlet 134 (FIG. 2), a kitchen sink faucet, and/or any other suitable use.

FIG. 4 provides a section view of water filtering assembly 200. Water filter 220 of water filtering assembly 200 includes a casing 230 that defines a chamber 231. Casing 230 also extends between a top portion 291 and a bottom portion 292, e.g., along the axial direction A. Casing 230 also defines an opening 233 at top portion 291 of casing 230. Opening 233 permits access to chamber 231 of casing 230.

A cap 240 is mounted to casing 230 at opening 233 of casing 230. Cap 240 defines an inlet 241 and an outlet 242. Inlet 241 is in fluid communication with entrance 212 of manifold 210 and with chamber 231 of casing 230. Thus, unfiltered water can enter chamber 231 of casing 230 through inlet 241 of cap 240. Outlet 242 of cap 240 is in fluid communication with exit 214 of manifold 210 and chamber 231 of casing 230. Thus, filtered water can exit chamber 231 of casing 230 through outlet 242 of cap 240.

A filtering media 232 is disposed within chamber 231. Filtering media 232 is spaced apart from an inner surface 290 of casing 230, e.g., along the radial direction R. In particular, a brace 286 positioned within chamber 231 and adjacent cap 240 supports filtering media 232 at top portion 291 of casing 240 in order to define a gap 262 between inner surface 290 of casing 230 and an outer surface 293 of filtering media 232. As an example, brace 286 may be glued or in some other manner fixed to filtering media 232 in order to define gap 262, position filtering media 232 vertically, and block potential bypass flow between filtering media 232 and outlet 242 of cap 240.

Filtering media 232 also divides chamber 231 into an unfiltered volume 272 and a filtered volume 274. Filtering media 232 can remove impurities and contaminants from water passing through filtering media 232 from unfiltered volume 272 to filtered volume 274. Filtering media 232 may include any suitable mechanism for filtering water such as, e.g., ceramic filters, activated carbon filters, polymer filters, or reverse osmosis filters.

As used herein, the term "unfiltered" describes a volume within chamber 231 that is not filtered relative to filtering media 232. However, as will be understood by those skilled in the art, water filtering assembly 200 may include additional filters that filter water entering chamber 231. Thus, "unfiltered volume" may be filtered relative to other filters but not filtering media 232.

As an example, water passing though water filtering assembly 200 can follow a path through water filtering assembly 200. In particular, unfiltered water can enter water filtering assembly 200 through entrance 212 of manifold 210. Such unfiltered water can then flow though inlet 241 of cap 240 into unfiltered volume 272 of chamber 231. Such unfiltered water can pass though filtering media 232 to remove impurities and can exit filtering media 232 into filtered volume 274 of chamber 231 as filtered water. Such filtered water can then pass through outlet 242 of cap 240 and exit water filtering assembly 200 through exit 214 of manifold 210.

In such a manner, unfiltered water can follow the path through water filtering assembly 200. In particular, unfiltered water can pass though filtering media 232, and filtered water can exit water filtering assembly 200. Such filtering can improve taste and/or safety of water. However, as will be understood by those skilled in the art, effectiveness of filtering media 232 can decrease over time. In particular, bacteria can accumulate or grow within filtering media 232 over time. Thus, filtering media 232 and/or water filter 220 may require changing after a certain time interval in order to maintain proper operation of water filtering assembly 200. In particular, filtering media 232 and/or water filter 220 may require changing about every six months. Water filtering assembly 200 includes features for assisting or encouraging such changing of filtering media 232 and/or water filter 220.

FIG. 5 illustrates a section view of water filter 220 removed from manifold 210. A plug 250 is mounted within inlet 241 of cap 240. Plug 250 is configured for blocking or impeding a flow of water through water filter 220, e.g., in order to encourage replacement of water filter 220. In particular, plug 250 is configured for blocking or impeding the flow of water through water filter 220 after about six months, e.g., when chamber 231 of casing 230 is filled with water. Plug 250 and other features of water filtering assembly 200 are discussed in greater detail below.

FIG. 6 is a partial, section view of water filter 220. Water filter 220 includes plug 250 and water soluble supports 260. Plug 250 has a top surface 252 and a bottom surface 254 that is positioned opposite top surface 252 such that top surface 252 and bottom surface 254 are spaced apart, e.g., along the axial direction A. Water soluble supports 260 are mounted, fixed, or connected to plug 250 on bottom surface 254 of plug 250 such that water soluble supports 260 project away from bottom surface 254 of plug 250, e.g., along the axial direction A. Water soluble supports 260 extend between plug 250 and brace 286 of cap 240 such that spaces 264 are defined between plug 250 and brace 286 of cap 240. Spaces 264 permit a flow of water between inlet 241 of cap 240 and filtered volume 274 of chamber 231.

Water soluble supports 260 are constructed of a water soluble material. Such water soluble material may, e.g., substantially dissolve in water at twenty degree Celsius in about six months. As an example, water soluble supports 260 may be constructed from polyvinyl alcohol (PVA). PVA can dissolve at a steady, predictable rate in water with a temperature between about one degree Celsius and about forty degrees Celsius. As an example, a one cubic inch block of PVA can completely dissolve in fifty degree Celsius water after about ninety hours. Conversely, the one cubic inch block of PVA can completely dissolve in forty degree Celsius water after about nine thousand hours.

As discussed above, water soluble supports 260 dissolve over time in water. Because water filter 220 is filled with water during operation of water filtering assembly 200, water soluble supports 260 will dissolve within inlet 241 over time. When water soluble supports 260 dissolve, plug 250 drops downwardly from a first position to a second position, e.g., along the axial direction A, to close or eliminate spaces 264. Thus, plug 250 prevents or hinders a flow of water through inlet 241 such that plug 250 hinders operation of water filtering assembly 200 after water soluble supports 260 dissolve and plug 250 drops to the second position. By clogging water filter 220, plug 250 and water soluble supports 260 can assist or encourage changing of filtering media 232 and/or water filter 220. As an example, water soluble supports 260 can dissolve after about six months and plug 250 can obstruct water filter 220. Accordingly, a user can be required to change water filter 220 in order for water filtering assembly 200 to work properly. Such changing can hinder undesirable bacterial growth within filtering media 232 as discussed above.

FIG. 7 is a perspective view of plug 250 and water soluble supports 260 removed from water filter 220. In the exemplary embodiment shown in FIG. 7, plug 250 has an annular shape. However, in alternative exemplary embodiments, plug 250 may have any suitable shape, e.g., as required when plug 250 is positioned in an alternative location within water filter 220.

In the exemplary embodiment shown in FIG. 7, water soluble supports 260 include eight supports. However, in alternative embodiments, water filter 220 may include any suitable number of water soluble supports, e.g., one, two, three, four, five, six, seven, nine, or more supports. Further, in the exemplary embodiment shown in FIG. 7, water soluble supports 260 are uniformly distributed on bottom surface 254 of plug 250 along the circumferential direction C. However, in alternative exemplary embodiments, water soluble supports 260 may be distributed in any suitable manner on bottom surface 254 or top surface 252. Water soluble supports 260 extend from bottom surface 254 of plug 250 by about a distance D. Distance D may be any suitable dimension, e.g., less than about an eighth of an inch, less than about a quarter of an inch, or less than about a half of an inch.

FIG. 8 provides a section view of a water filter 300 according to an additional exemplary embodiment of the present subject matter. Water filter 300 is substantially similar to water filter 200 (FIG. 4). FIG. 9 is a partial, section view of water filter 300. As may be seen in FIG. 9, water filter 300 includes a cap 310 that defines an inlet 312 and an outlet 314. Like water filter 200, water filter 300 includes a plug 320 and a water soluble support 330. Plug 320 and water soluble support 330 function in the same manner as plug 250 and water soluble supports 260 (FIG. 6). However, plug 320 and water soluble support 330 are disposed within outlet 314 rather than inlet 312 as in water filter 200.

FIG. 10 provides a partial, section view of plug 320 and water soluble support 330 of water filter 300. Plug 320 is supported by water soluble support 330 such that a space 316 is defined between plug 320 and cap 310. Water can flow through space 316 until water soluble support 330 dissolves, and plug 320 is urged against cap 310, e.g., along the axial direction A, and closes space 316. In such a configuration, plug 320 impedes a flow of water out of a chamber 302 though outlet 314. Thus, a user can be encouraged or required to change water filter 300 in order to receive filtered water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water filter, comprising:
   a casing that defines a chamber for receipt of water to be filtered;
   a filtering media disposed within the chamber of said casing, wherein said casing and said filtering media define a path for a flow of water through the chamber of said casing;
   an annular plug positioned within the chamber of said casing and in the path for the flow of water through chamber of said casing; and
   a plurality of water soluble supports positioned on and fixed to said plug;
   wherein said plurality of water soluble supports is configured to position said plug to permit the flow of water through the chamber of said casing, wherein said plug hinders the flow of water through chamber of said casing when said plurality of water soluble supports has dissolved.

2. The water filter of claim 1, further comprising a cap, wherein said casing defines an opening that permits access to the chamber of said casing, said cap mounted to said casing at the opening of said casing, said cap defining an inlet and an outlet, the inlet of said cap permitting a flow of liquid into the chamber of said casing, the outlet of said cap permitting a flow of liquid out of the chamber of said casing.

3. The water filter of claim 2, wherein said plug and said plurality of water soluble supports are positioned at the outlet of said cap.

4. The water filter of claim 3, wherein each water soluble support of said plurality of water soluble supports extends between said plug and said cap in order to hinder said plug from obstructing the flow of liquid out of the chamber of said casing.

5. The water filter of claim 1, wherein said plurality of water soluble supports comprises polyvinyl alcohol.

6. The water filter of claim 1, said plurality of water soluble supports is configured to dissolve in water in about six months.

7. The water filter of claim 1, wherein said filtering media comprises activated carbon.

8. The water filter of claim 1, wherein said plurality of water soluble supports comprises at east four water soluble supports.

9. The water filter of claim 1, wherein the water soluble supports of said plurality of water soluble supports are uniformly distributed on a bottom surface of said plug.

10. A refrigerator appliance, comprising:
   a cabinet that defines a chilled compartment for receipt of food items for storage;
   a water filter mounted to said cabinet, said water filter comprising:
      a casing that defines a chamber for receipt of water to be filtered;
      a filtering media disposed within the chamber of said casing, wherein said casing and said filtering media define a path for a flow of water through the chamber of said casing;
      an annular plug positioned within the chamber of said casing and in the path for the flow of water through chamber of said casing; and
      a plurality of water soluble support or and fixed to said plug;
      wherein said plurality of water soluble supports is configured to position said plug to permit the flow of water through the chamber of said casing, wherein said plug hinders the flow of water through chamber of said casing when said plurality of water soluble supports has dissolved.

11. The refrigerator appliance of claim 10, further comprising a cap, wherein said casing defines an opening that permits access to the chamber of said casing, said cap mounted to said casing at the opening of said casing, said cap defining an inlet and an outlet, the inlet of said cap permitting a flow of liquid into the chamber of said casing, the outlet of said cap permitting a flow of liquid out of the chamber of said casing.

12. The refrigerator appliance of claim 11, wherein said plug and said plurality of water soluble supports are positioned at the outlet of said cap.

13. The refrigerator appliance of claim 12, wherein each water soluble support of said plurality of water soluble supports extends between said plug and said cap in order to hinder said plug from obstructing the flow of liquid out of the chamber of said casing.

14. The refrigerator appliance of claim 10, wherein each water soluble support of said plurality water soluble supports comprises polyvinyl alcohol.

15. The refrigerator appliance of claim 10, each water soluble support of said plurality of water soluble supports is configured to dissolve in water in about six months.

16. The refrigerator appliance of claim 10, wherein said plurality of water soluble supports comprises at least four water soluble supports.

17. The refrigerator appliance of claim 10, wherein the water soluble supports of said plurality of water soluble supports are uniformly distributed on a bottom surface of said plug.

* * * * *